Oct. 30, 1956  A. G. BODINE, JR  2,768,819
ENGINE FUEL SYSTEM
Filed Feb. 19, 1951  2 Sheets-Sheet 2

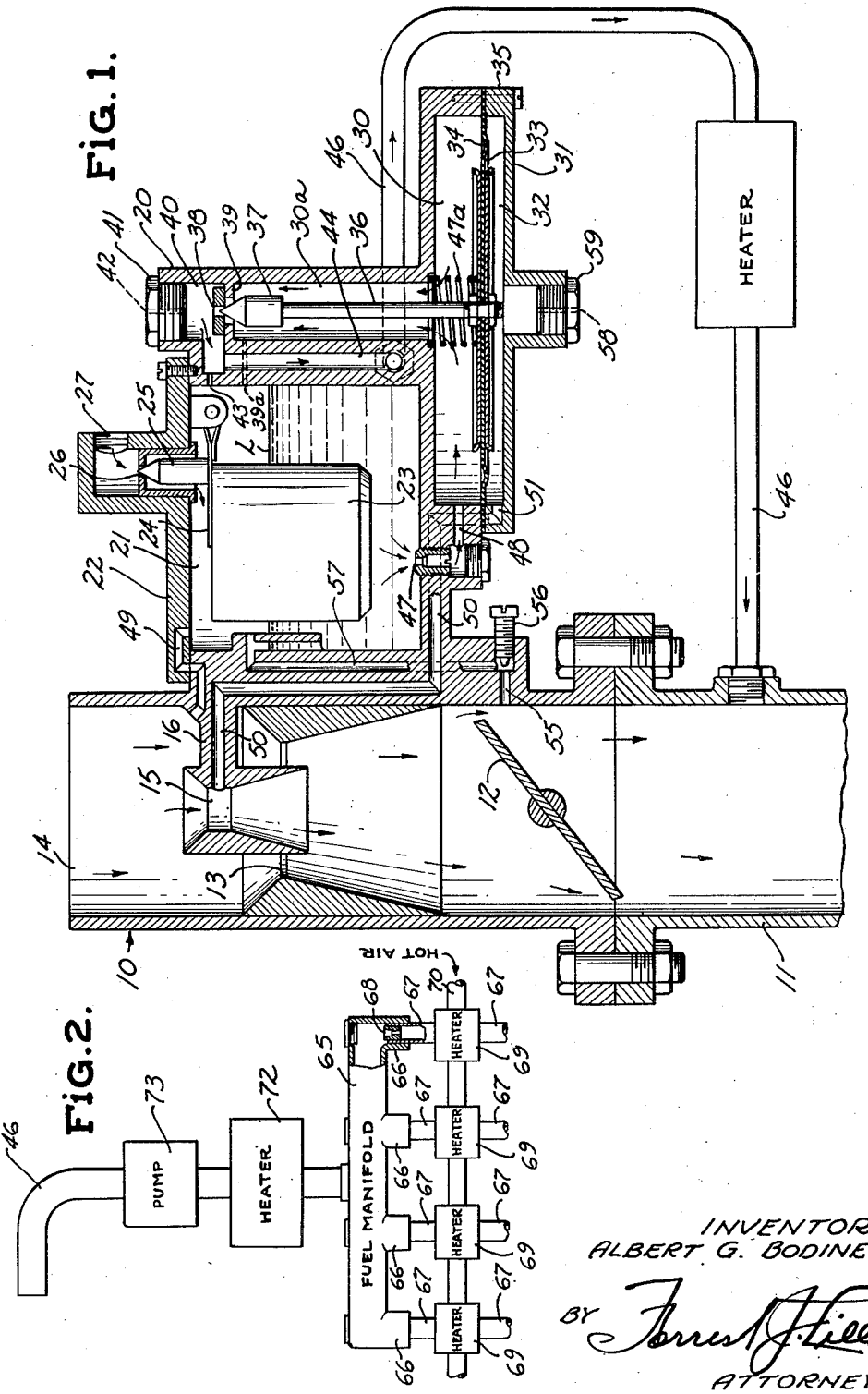

ALBERT G. BODINE JR.
INVENTOR.

BY
ATTORNEY.

United States Patent Office 2,768,819
Patented Oct. 30, 1956

2,768,819

ENGINE FUEL SYSTEM

Albert G. Bodine, Jr., Van Nuys, Calif.

Application February 19, 1951, Serial No. 211,607

13 Claims. (Cl. 261—37)

This invention relates generally to engine fuel systems, and more particularly to simple flow control devices for controlling the proportionality between fuel and air for internal combustion engines.

The present invention may be regarded generally as dealing with improvements in the engine fuel system disclosed in my prior Patent No. 2,520,120. In said patent, I disclosed a fuel system wherein the fuel was metered by a diaphragm controlled valve moving under the differential influence of air pressure in a venturi in the air induction pipe, and fuel pressure fed from a supply tank at atmospheric pressure. This system permitted injection of the fuel to the air stream at any desired point, for example, downstream of the venturi and throttle, and permitted any desired preheating of the fuel, after metering, for better atomization.

The present invention has as its object the provision of improvements in my said prior engine fuel system, particularly as regards effective handling of engine fuels containing highly volatile components.

The fuel system of the present invention provides a combination including a float chamber functioning to provide a supply of fuel, at substantially the same pressure as the air entering the air induction pipe, which supply of fuel has very short flow conduits to and through the metering orifice and the diaphragm controlled metering valve. This permits the injection of very volatile fuel with an atmospheric pressure fuel system, thus eliminating maintenance of pressure on the fuel system. This is an accomplishment which, insofar as I am aware, has not previously been achieved excepting in very complicated and expensive engine fuel systems.

Various additional objects and corresponding accomplishments of the invention will appear and be made evident in the course of the following detailed description of certain illustrative embodiments thereof, reference for this purpose being had to the accompanying drawings, in which:

Figure 1 is a cross-sectional view of a fuel-air metering mechanism in accordance with the invention;

Figure 2 is an elevational view showing a branched engine fuel manifold fed by the fuel delivery line of the metering device of the invention.

Figure 3:
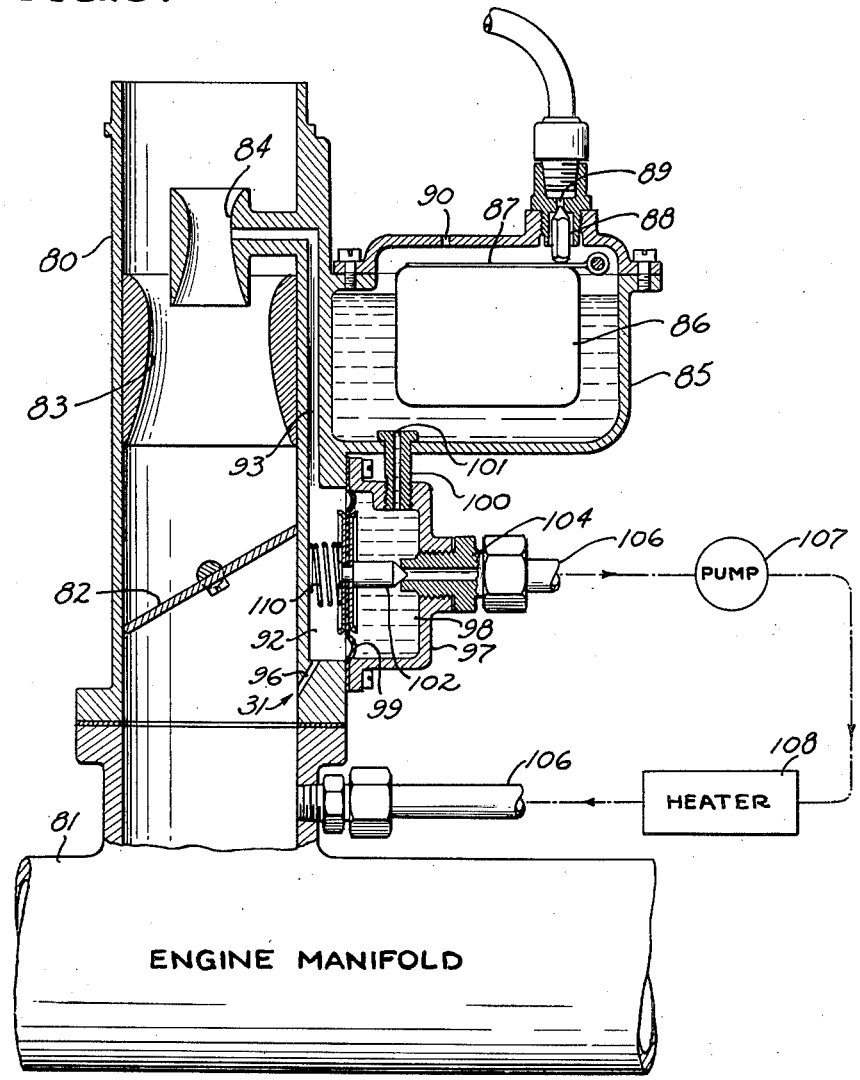
Figure 3 is a cross-sectional view of an alternative embodiment of the fuel-air metering device of the invention.

In the drawings, numeral 10 designates generally an air induction pipe adapted to supply air to the intake manifold 11 of an engine, this induction pipe 10 being provided with a butterfly valve 12, a venturi throat 13 for creating a pressure differential proportional to air flow, and an open inlet end 14 in communication with the atmosphere. Mounted within the venturi throat 13 is a booster venturi 15, supported on a tubular member 16 projecting laterally inside the pipe 14 from the side wall thereof.

Formed integrally with induction pipe 10 is a laterally extending body 20, which contains, in close proximity to pipe 10, a float chamber 21 equipped with cover plate 22. Within float chamber 21 is float 23, carried by a pivotally mounted arm 24. Float 23 controls the position of needle valve 25, which in turn controls orifice 26 between fuel inlet connection 27 and the float chamber. The float 23 will be understood to operate in the usual manner to maintain a constant static level L of liquid fuel within chamber 21.

Formed in the lower portion of body 20, partially below float chamber 21 and partially projecting laterally therebeyond, is a circular fuel chamber 30 which communicates with the bottom of the float chamber via a later described orifice 47. A cover or closure member 31 is secured to body 20 below chamber 30, and provides an additional chamber space 32. The two chamber spaces or compartments 30 and 32 are divided by a movable pressure differential responsive diaphragm 33 having a resilient compliance at 34 and whose rim is clamped and sealed by the marginal portion 35 of cover 31, as clearly indicated in the drawings. Secured to the central portion of diaphragm 33 is a metering valve rod 36 which projects upwardly through a tubular chamber extension 30a and has at its upper end a conical valve 37 controlling a fuel delivery orifice 38 mounted over the apertured top wall 39 of chamber extension 30a. The orifice 38 is located at a somewhat higher elevation than the normal level L in the float chamber, as clearly shown in Figure 1, so that during idling, or with the engine stopped, liquid fuel will not escape past the valve element 37 in the event that the latter should not normally engage tightly with its seat formed at the entrance of the orifice 38. A small diameter orifice 39a, much finer than the orifice 47, connects the chamber extension 30a with the upper portion of the float chamber at an elevation above the liquid level L.

Above the orifice 38 the body 20 contains a small chamber space 40, whose opening through the top of the casing is closed by a plug 41 preferably formed with a fine suction vent 42. A small diameter port 43 preferably connects chamber 40 with the float chamber, and a vertical fuel passage 44 extends downwardly from chamber 40 between and in relatively close spaced relation to the chamber space 30a and the float chamber 21, being thus in heat exchange relationship with the fuel in the float chamber and in chamber space 30a. Near the bottom of the float chamber, the fuel passage 44 extends laterally and connects with fuel delivery line 46 which, as shown in Figure 1, connects into engine manifold 11 at a point a short distance downstream from butterfly valve 12.

The diaphragm 33 may be spring biased to normally urge metering valve 37 toward open or closed position. In Figure 1, I have shown spring biasing toward the open position, and for this purpose, a coil compression spring 47 is interposed between the top wall of chamber 30 and the diaphragm.

The bottom of float chamber 21 is in communication with upper diaphragm chamber 30 by way of a fuel outlet passage containing metering orifice or jet 47 and extended as at 48 into chamber 30. The fuel in chamber 30 will normally, under idling conditions, stand in chamber extension 30a at the same level as in the float chamber. Vapor passage 39a tends to equalize the pressures in the float chamber and the diaphragm chamber 30, 30a, so that these liquid levels will come into balance. Also, during idling conditions, there will be only a small body of vapor immediately below orifice 38, and an accidental momentary opening of valve 37 (caused by jolting) or formation, owing to heating, of vapor in chamber 30a too rapid for effective immediate relief back through orifice 43 and vent 28, will discharge only vapor to fuel delivery line 46 rather than rich liquid fuel.

The float chamber 21 is maintained at substantially the air pressure at the intake end of air induction pipe 10 by an intercommunicating passageway 49, and it will be seen that this pressure is substantially atmospheric pressure. An equivalent is simply a small air vent to atmosphere through the cover plate 22, as in a later described embodiment.

Leading from the throat of booster venturi 15 is an air passage 50 which extends first through tubular venturi supporting member 16, thence downwardly between air induction pipe 10 and float chamber 21, then horizontally under the float chamber, and finally down to communicate with an air port 51 in diaphragm chamber cover 31 opening to the lower diaphragm chamber 32.

An idling jet 55 opens inside air induction pipe 10 in the region of butterfly valve 12, being controlled by needle valve 56, and receiving fuel by way of passage 57 and suitable intake ports opening inside the float chamber.

A small vent 58 formed in a closure plug 59 mounted in diaphragm chamber cover 31 is preferably provided to drain off moisture which may accumulate in lower diaphragm chamber 32.

Operation of my fuel metering system depends upon the differential of pressures created in diaphragm chambers 30 and 32 in response to dynamic flows of fuel through orifice 47 and air through venturi 15. Air flow through venturi 15 creates a metering head reduction in pressure proportional to the total air flow through air induction pipe as controlled by throttle 12. This dynamic metering head is transmitted through passage 50 and port 51 to lower diaphragm chamber 32. Increased air flow through venturi 15 will, of course, further reduce the pressure in chamber 32.

The absolute pressure in the upper diaphragm chamber 30, under idling conditions, is determined by the float chamber fuel level L, plus substantially atmospheric pressure communicating to float chamber 21 by way of passage 49 leading from the open end portion of air induction pipe 10. During idling conditions, the static fuel head would evidently tend to open metering valve 37, since the pressure in chamber 30 exceeds that in chamber 32 by reason of the static head owing to liquid level L. I may bias the metering valve 37 to closed position by way of a spring on the under side of diaphragm 33, in accordance with the arrangement employed in a subsequently described embodiment. However, in the present instance, the metering valve is above the fuel level for idling conditions, and the fact that the metering valve may momentarily open by a slight amount, accordingly results in no loss of liquid fuel. In fact, in the present embodiment, the diaphragm valve is actually spring biased toward open position, and the reason for this arrangement will be described presently.

As already explained, dynamic air flow through the air induction pipe 10 reduces the pressure in lower diaphragm chamber 32, and the wider the throttle opening, the greater this pressure reduction. This pressure reduction below the diaphragm tends to move the diaphragm in a downward direction, so as to open valve 37 from its seat at orifice 38, with the result that manifold suction communicated to chamber 40 through fuel delivery line 46 results in a dynamic fuel flow through chamber 30 toward the engine. Replenishing of the fuel so withdrawn from chamber 30 through metering orifice 47 from float chamber 21 causes a pressure drop through orifice 47. When this pressure drop reduces the pressure in chamber 30 below the pressure in 32 (biasing forces on the diaphragm owing to its weight, spring, and the like being disregarded), the diaphragm will tend to rise and move metering valve 37 toward closed position. In actual operation, diaphragm 33 automatically "hunts" for, and then remains at, an equilibrium position for the valve 37 which will result in a balance of the opening and closing forces for the valve. Of course, any change of throttling will result in a new equilibrium position being found and maintained.

During engine operation, particularly under idling conditions, the manifold suction is communicated by way of fuel delivery line 46 to chamber 40 immediately above orifice 38 and metering valve 37 tends to be pulled by this suction against its seat. Biasing spring 47a is designed to overcome or balance this tendency. As already mentioned, the metering valve 37 and orifice 38 being located above the fuel level line L, an additional substantial discharge of fuel under idling conditions is prevented even though the metering valve might move momentarily slightly off its seat.

The two bleeder passages 42 and 43 assist fuel vaporization in passage 44 and fuel delivery line 46, increasing the total dynamic flow therethrough and tending to prevent liquid fuel accumulation therein. A partially vaporized fuel stream flowing along passageway 44 is in heat exchange relationship with flow chamber 14 and diaphragm chamber 30, 30a, thus combating vapor lock at the entrance to orifices 47 and 38.

Beyond passageway 44, and within fuel delivery line 46, the fuel may be vaporized to any desired degree, for instance by way of a suitable heater, as conventionally indicated in Figure 1.

It will be seen that the fuel metering is unaffected by any variations in the pressure in the induction pipe or manifold into which the fuel may be discharged. The fuel may accordingly be discharged into the manifold at a point downstream from the venturi and from the butterfly valve. The pressure at this point downstream is variable but is usually substantially less than atmospheric. This relatively low pressure or partial vacuum at the point of fuel discharge greatly improves the rapid vaporization and dispersion of the fuel throughout the air stream. It will also be evident that the present system permits application of heat to the metered fuel beyond the point of metering. Heating of the fuel in a conventional carburetor, between the metering orifice and the point of fuel delivery through the venturi, is of course not feasible for reasons well understood in the art. The present system permits such heating without interfering with the metering of the fuel, or with the metered proportionality of fuel to air, and such heating promotes atomization and mixing to a substantial extent. In addition, this is accomplished without necessitating heating of the entire manifold and air stream, causing consequent loss in volumetric efficiency of the engine and reduced anti-knock value of the fuel-air mixture.

Fig. 2 shows the fuel delivery line 46, understood to be supplied with fuel by a metering system as disclosed in Figure 1, leading to a branching fuel manifold 65, said manifold having branches 66 discharging to pipes 67 which may be controlled by metering orifices such as 68. The pipes 67 may go directly to the intake ports of the internal combustion engine to be fed thereby, but are here shown as surrounded by individual heaters 69 supplied with hot air flowing through a pipe 70. Figure 2 is thus illustrative of the feasibility of supplying fuel separately, through branching delivery pipes, to separate cylinders of an engine. Figure 2 also shows the use, around main fuel delivery line 46, of a heater 72, and in addition, Figure 2 illustrates the use of a fuel pump 73 in the fuel delivery line 46. It will be understood that this fuel pump operates on whatever volume of fuel is supplied by the metering system, and acts solely to build up the pressure at which the fuel is injected to the cylinders of the engine. It will also be understood that such a fuel pump might be employed in the fuel delivery line 46 of the system of Figure 1. The use of such a pump further atomizes and vaporizes the fuel, and taken in connection with the heater, assures delivery of highly vaporized and dispersed fuel to the engine.

Figure 3 shows a modified form of the invention, the air induction pipe in this instance being indicated at 80, and being connected to engine manifold 81 as indicated. The air induction pipe has butterfly throttle valve 82, a venturi throat 83, together with booster venturi 84, of substantially the same form as in the first-described embodiment. Projecting laterally from pipe 80 is float chamber 85 containing float 86 carried by pivoted arm 87. Float 86 regulates the position of needle valve 88, which controls fuel inlet orifice 89. Atmospheric pressure is maintained in the upper portion of float chamber 85 by means of an air vent 90 in the float chamber cover. Formed at one side of air induction pipe 80, just below float chamber 85, is a diaphragm chamber 92, in communication with the throat of booster venturi by means of air passage 93. A small vent 96 connects the lower side of chamber 92 with the interior of pipe 80 to drain off any moisture tending to collect in chamber 92. A shell 97 mounted over chamber 92 provides fuel diaphragm chamber 98, and the chambers 92 and 98 are separated by a flexible diaphragm 99 similar to the diaphragm of the first-described embodiment.

The bottom of float chamber 85 communicates with fuel chamber 98 by means of a stud 100 having a metering orifice 101. The center of diaphragm 99 carries valve element 102 whose conical end engages a valve seat at the end of orifice member 104 mounted in shell 97, and to which is coupled fuel delivery line 106. This line 106 is connected into engine manifold 81 as indicated, and preferably has incorporated therein a fuel pump 107. In addition, a heater 108 may be employed to heat the metered fuel just prior to injection into the manifold.

Diaphragm 99 is in this instance biased by coil spring 110 to move valve 102 normally against its seat. This is of advantage in this embodiment, since the metering valve is here below the liquid level, and liquid fuel would otherwise be discharged to the fuel delivery line at a time that the valve 102 should become accidentally unseated.

The fuel metering system of Figure 3 operates essentially in the same way as does that of Figure 1, the valve controlling diaphragm 99 taking a position, at any setting of throttle 82, for which the pressures in chambers 92 and 98, as determined by the air suction developed in venturi 84 and the pressure drop in chamber 98, become equalized. The total pressure on the air side of the diaphragm 99 is in this instance increased somewhat by the biasing spring 110, and it will of course be understood that in this embodiment, the valve 102 will find a position at which the total pressures, taking into account such biasing pressure, become equalized.

The system of Figure 3 has essentially the same advantages as that of Figure 1, but has one additional advantage in that fuel is always present at the inlet end of fuel delivery orifice member 104, so that there is no waiting period whatsoever after opening of the throttle from idle position before liquid fuel is delivered to line 104 and to the engine manifold.

It will of course be understood that the embodiments chosen for illustration are merely typical of practical forms in which the invention may be embodied, and that various changes in design, structure and arrangement may be made without departing from the spirit and scope of the invention as defined in the appended claims.

I claim:

1. An apparatus for metering fuel and air to an internal combustion engine, comprising the combination of: an air conduit for a combustion air stream having an air inlet and having an outlet adapted to be connected to the air manifold of an engine, a venturi throat in said air conduit, an fuel float chamber with a fuel inlet and a fuel outlet passage, a float in said chamber, a float actuated valve controlling said fuel inlet to maintain a normal liquid fuel level in said float chamber, air passage means opening into the vapor space of said float chamber for maintaining said float chamber at substantially the same pressure as that at the intake end of said air conduit whereby said fuel is supplied to said outlet passage at substantially atmospheric pressure, a metering orifice in said fuel outlet passage, a pressure-differential-responsive metering valve operating means consisting of casing means and a single movable diaphragm therein providing one air chamber and one fuel chamber on opposite sides of said single diaphragm, a passage connecting said air chamber in pressure responsive relation to the throat region of said venturi, said fuel outlet passage connecting said metering orifice to said fuel chamber, a fuel delivery orifice leading from said fuel chamber, a metering valve controlling said fuel delivery orifice and so operatively connected with said single diaphragm as to tend to open with decrease in pressure communicated from said venturi to said first air chamber and to tend to close with decrease in fuel pressure communicated from said metering orifice to said fuel chamber, and a fuel delivery passage leading from said fuel delivery orifice to deliver metered fuel for supply to said air stream.

2. The subject matter of claim 1, including a fuel delivery line leading from said fuel delivery passage and discharging to said air stream, and a fuel pump in said fuel delivery line.

3. The subject matter of claim 1, including also a branched fuel manifold for said engine, and a fuel delivery line leading from said fuel delivery passage to said manifold.

4. The subject matter of claim 1, wherein said fuel delivery orifice and metering valve are positioned below the liquid level maintained in said float chamber.

5. An apparatus for metering fuel and air to an internal combustion engine, comprising the combination of: an air conduit for a combustion air stream, a venturi throat in said conduit, a fuel float chamber mounted at one side of said air conduit, said chamber having a fuel inlet, a float in said chamber, a float actuated valve controlling said fuel inlet, a fuel passage leading from the lower portion of said chamber, a metering orifice in said passage, an air passage communicating substantially atmospheric pressure to the interior of said float chamber, a diaphragm casing adjoining the lower portion of said float chamber, a horizontally disposed diaphragm in and across said casing forming upper and lower diaphragm chambers, said casing including a top side vertical extension of said upper diaphragm chamber rising to an elevation above the normal fuel level maintained in said float chamber, a fuel delivery orifice at the upper end of said extension, a rod connected to said diaphragm extending through said vertical extension and a valve on the upper end thereof for controlling said fuel delivery orifice, a chamber over said last mentioned orifice, a fuel delivery conduit leading from said last mentioned chamber, said fuel passage that contains said metering orifice opening into said upper diaphragm chamber, and an air passage interconnecting said venturi throat with said lower diaphragm chamber.

6. The subject matter of claim 5, including also a vapor passage connecting said float chamber and the upper end portion of said vertical diaphragm chamber extension at a level above normal fuel level in the float chamber.

7. The subject matter of claim 5, including also a vent between the vapor space at the top of the float chamber and said chamber over said fuel delivery orifice.

8. The subject matter of claim 5, including also an atmospheric vent opening into the top of said chamber over said fuel delivery orifice.

9. An apparatus for metering fuel and air to an internal combustion engine, comprising the combination of: an air conduit for a combustion air stream having an air inlet and having an outlet adapted to be connected to the air manifold of an engine, a venturi throat in said air conduit, a fuel float chamber with a fuel inlet and a fuel outlet passage, a float in said chamber, a float actuated valve controlling said fuel inlet to maintain a normal liquid fuel level in said float chamber, air passage means opening into the vapor space of said float chamber for maintaining said float chamber at substantially the same pressure as that at the intake end of said air conduit, a metering orifice in said fuel outlet passage, a pressure-differential-responsive metering valve operating means consisting of casing means and a single movable diaphragm therein providing one air chamber and one fuel chamber on opposite sides of said single diaphragm, a passage connecting said air chamber in pressure responsive relation to the throat region of said venturi, said fuel outlet passage connecting said metering orifice to said fuel chamber, a fuel delivery orifice leading from said fuel chamber, a metering valve controlling said fuel delivery orifice and so operatively connected with said single diaphragm as to tend to open with decrease in pressure communicated from said venturi to said first air chamber and to tend to close with decrease in fuel pressure communicated from said metering orifice to said fuel chamber, and a fuel delivery passage leading from said fuel delivery orifice to deliver metered fuel for supply to said airstream, there being an atmospheric vent opening to said fuel delivery passage on the downstream side of said valve controlled fuel delivery orifice.

10. An apparatus for metering fuel and air to an internal combustion engine, comprising the combination of: an air conduit for a combustion air stream having an air inlet and having an outlet adapted to be connected to the air manifold of an engine, a venturi throat in said air conduit, a fuel float chamber with a fuel inlet and a fuel outlet passage, a float in said chamber, a float actuated valve controlling said fuel inlet to maintain a normal liquid fuel level in said float chamber, air passage means opening into the vapor space of said float chamber for maintaining said float chamber at substantially the same pressure as that at the intake end of said air conduit, a metering orifice in said fuel outlet passage, a pressure-differential-responsive metering valve operating means consisting of casing means and a single movable diaphragm therein providing one air chamber and one fuel chamber on opposite sides of said single diaphragm, a passage connecting said air chamber in pressure responsive relation to the throat region of said venturi, said fuel outlet passage connecting said metering orifice to said fuel chamber, a fuel delivery orifice leading from said fuel chamber, a metering valve controlling said fuel delivery orifice and so operatively connected with said single diaphragm as to tend to open with decrease in pressure communicated from said venturi to said first air chamber and to tend to close with decrease in fuel pressure communicated from said metering orifice to said fuel chamber, and a fuel delivery passage leading from said fuel delivery orifice to deliver metered fuel for supply to said air stream, there being a vent between the vapor space at the top of said float chamber and said fuel delivery passage on the downstream side of said valve controlled fuel delivery orifice.

11. An apparatus for metering fuel and air to an internal combustion engine, comprising the combination of: an air conduit for a combustion air stream having an air inlet and having an outlet adapted to be connected to the air manifold of an engine, a venturi throat in said air conduit, a fuel float chamber with a fuel inlet and a fuel outlet passage, a float in said chamber, a float actuated valve controlling said fuel inlet to maintain a normal liquid fuel level in said float chamber, air passage means opening into the vapor space of said float chamber for maintaining said float chamber at substantially the same pressure as that at the intake end of said air conduit, a metering orifice in said fuel outlet passage, a pressure-differential-responsive metering valve operating means consisting of casing means and a single movable diaphragm therein providing one air chamber and one fuel chamber on opposite sides of said single diaphragm, a passage connecting said air chamber in pressure responsive relation to the throat region of said venturi, said fuel outlet passage connecting said metering orifice to said fuel chamber, a fuel delivery orifice leading from said fuel chamber, a metering valve controlling said fuel delivery orifice and so operatively connected with said single diaphragm as to tend to open with decrease in pressure communicated from said venturi to said first air chamber and to tend to close with decrease in fuel pressure communicated from said metering orifice to said fuel chamber, and a fuel delivery passage leading from said fuel delivery orifice to deliver metered fuel for supply to said air stream, there being a pressure equalizing passage between the vapor spaces in the upper portions of said float chamber and said fuel chamber.

12. An apparatus for metering fuel and air to an internal combustion engine, comprising the combination of: an air conduit for a combustion air stream having an air inlet and having an outlet adapted to be connected to the air manifold of an engine, a venturi throat in said air conduit, a fuel float chamber with a fuel inlet and a fuel outlet passage, a float in said chamber, a float actuated valve controlling said fuel inlet to maintain a normal liquid fuel level in said float chamber, air passage means opening into the vapor space of said float chamber for maintaining said float chamber at substantially the same pressure as that at the intake end of said air conduit, a metering orifice in said fuel outlet passage, a pressure-differential-responsive metering valve operating means consisting of casing means and a single movable diaphragm therein providing one air chamber and one fuel chamber on opposite sides of said single diaphragm, a passage connecting said air chamber in pressure responsive relation to the throat region of said venturi, said fuel outlet passage connecting said metering orifice to said fuel chamber, a fuel delivery orifice leading from said fuel chamber, a metering valve controlling said fuel delivery orifice and so operatively connected with said single diaphragm as to tend to open with decrease in pressure communicated from said venturi to said first air chamber and to tend to close with decrease in fuel pressure communicated from said metering orifice to said fuel chamber, and a fuel delivery passage leading from said fuel delivery orifice to deliver metered fuel for supply to said air stream, at least a portion of the fuel chamber together with said fuel delivery orifice and metering valve being positioned above the liquid level maintained in said float chamber.

13. The subject matter of claim 12, including also a pressure equalizing vapor passage connecting said float chamber and said portion of said fuel chamber at a level above said normal fuel level in said float chamber.

References Cited in the file of this patent

UNITED STATES PATENTS

| | | |
|---|---|---|
| 1,825,830 | Sullivan | Oct. 6, 1931 |
| 1,982,049 | Fageol | Nov. 27, 1934 |
| 2,255,296 | Moseley | Sept. 9, 1941 |
| 2,372,306 | Adair | Mar. 27, 1945 |
| 2,533,863 | Wirth et al. | Dec. 12, 1950 |